(12) United States Patent
Zhang et al.

(10) Patent No.: US 10,549,689 B2
(45) Date of Patent: Feb. 4, 2020

(54) VEHICLE-MOUNTED COMMUNICATION DEVICE, METHOD FOR THE SAME, AND VEHICLE

(71) Applicant: BOE Technology Group Co., Ltd., Beijing (CN)

(72) Inventors: Ying Zhang, Beijing (CN); Yu Gu, Beijing (CN); Hongli Ding, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/013,173

(22) Filed: Jun. 20, 2018

(65) Prior Publication Data
US 2019/0061618 A1    Feb. 28, 2019

(30) Foreign Application Priority Data
Aug. 24, 2017    (CN) .......................... 2017 1 0740397

(51) Int. Cl.
*B60Q 1/00*  (2006.01)
*B60Q 9/00*  (2006.01)
*B60Q 1/14*  (2006.01)

(52) U.S. Cl.
CPC ........ *B60Q 9/00* (2013.01); *B60Q 1/14* (2013.01)

(58) Field of Classification Search
CPC .................................. B60Q 9/00; B60Q 1/14
See application file for complete search history.

(56) References Cited

U.S. PATENT DOCUMENTS 5,113,175 A * 5/1992 Adell ..................... B60Q 1/50
340/457.2
5,237,306 A * 8/1993 Adell ................... B60Q 1/1407
340/469
(Continued)

FOREIGN PATENT DOCUMENTS

| CN | 204340848 U | 5/2015 |
|---|---|---|
| CN | 204547898 U | 8/2015 |

(Continued)

OTHER PUBLICATIONS

First Office Action, including Search Report, for Chinese Patent Application No. 201710740397.1, dated Mar. 4, 2019, 21 pages.

*Primary Examiner* — Quang Pham
(74) *Attorney, Agent, or Firm* — Westman, Champlin & Koehler, P.A.

(57) ABSTRACT

The embodiments of the present disclosure provide a vehicle-mounted communication device, a method for the same, and a vehicle. The vehicle-mounted communication device comprises: a first signal transmission module configured to transmit a turn-off alert signal for alerting to turn off a high beam on condition that it is determined that a particular region of the vehicle is illuminated by the high beam; a first signal reception module configured to receive a turn-off alert signal for alerting to turn off a high beam transmitted by another vehicle; a processor configured to perform one of the following operations on condition that the high beam of the vehicle is turned on and the first signal reception module receives the turn-off alert signal: switching the vehicle to low beam illumination; and generating a prompt signal for prompting to switch to low beam illumination.

19 Claims, 5 Drawing Sheets

(56) References Cited

U.S. PATENT DOCUMENTS

| | | | | |
|---|---|---|---|---|
| 5,347,261 | A | * | 9/1994 | Adell ................... B60Q 1/38 307/10.8 |
| 7,005,977 | B1 | * | 2/2006 | Tengler ................ B60Q 1/143 340/457 |
| 9,313,862 | B1 | * | 4/2016 | Helton ............... H05B 37/0272 |
| 2004/0021853 | A1 | * | 2/2004 | Stam .................. B60Q 1/1423 356/218 |
| 2004/0149895 | A1 | * | 8/2004 | Agranti ................ B60Q 1/143 250/221 |
| 2007/0063824 | A1 | * | 3/2007 | Gaddy ............ G08G 1/096783 340/426.21 |
| 2007/0147055 | A1 | * | 6/2007 | Komatsu .............. B60Q 1/085 362/464 |
| 2010/0114439 | A1 | * | 5/2010 | Yuter ...................... B60J 3/02 701/49 |
| 2017/0083774 | A1 | * | 3/2017 | Solar ................ G06K 9/00798 |
| 2018/0253959 | A1 | * | 9/2018 | Andrade .............. B60N 2/002 |

FOREIGN PATENT DOCUMENTS

| | | |
|---|---|---|
| CN | 105522955 A | 4/2016 |
| CN | 105978990 A | 9/2016 |
| CN | 106864353 A | 6/2017 |

\* cited by examiner

VEHICLE-MOUNTED COMMUNICATION DEVICE, METHOD FOR THE SAME, AND VEHICLE

CROSS-REFERENCE TO RELATED APPLICATION(S)

This application claims priority to the Chinese Patent Application No. 201710740397.1, filed on Aug. 24, 2017, which is incorporated herein by reference in its entirety.

TECHNICAL FIELD

The present disclosure relates to the field of smart driving technology of vehicles, and more particularly, to a vehicle-mounted communication device, a method for the same, and a vehicle.

BACKGROUND

A driver may transfer information with specific meanings to other vehicles through lights and whistles etc. of his/her vehicle while driving. For example, turn-on of high beams is one of the important causes of traffic accidents during driving at night, and in order to reduce dangers caused by the high beams for driving at night, a driver may alert a driver of an oncoming vehicle of which a high beam is turned on to turn off the high beam by alternately turning on a high beam and a low beam. However, this alert manner has a weak degree of alert, and it is often impossible to effectively alert the driver of the oncoming vehicle to turn off the high beam thereof, and thus it is difficult to reduce the occurrence of accidents.

SUMMARY

In an aspect of the present disclosure, there is provided a vehicle-mounted communication device, comprising: a first signal transmission module configured to transmit a turn-off alert signal for alerting to turn off a high beam on condition that it is determined that a particular region of the vehicle is illuminated by the high beam; a first signal reception module configured to receive a turn-off alert signal for alerting to turn off a high beam transmitted by another vehicle; a processor configured to perform one of the following operations on condition that the high beam of the vehicle is turned on and the first signal reception module receives the turn-off alert signal: switching the vehicle to low beam illumination; and generating a prompt signal for prompting to switch to low beam illumination.

In an embodiment, the vehicle-mounted communication device further comprises: an illumination sensor configured to detect whether the particular region of the vehicle is illuminated by the high beam, wherein the first signal transmission module is configured to transmit the turn-off alert signal on condition that the illumination sensor detects that the particular region is illuminated by the high beam.

In an embodiment, the vehicle-mounted communication device further comprises: a controller electrically connected to the illumination sensor, the first signal transmission module, the first signal reception module, and the processor, wherein the controller is configured to: control the illumination sensor and the first signal transmission module to be turned on and the first signal reception module to be turned off on condition that a low beam of the vehicle is turned on, and control the illumination sensor and the first signal transmission module to be turned off and the first signal reception module to be turned on on condition that the high beam of the vehicle is turned on.

In an embodiment, the vehicle-mounted communication device further comprises: a second signal transmission module configured to transmit a high beam indication signal indicating that the high beam is in a turn-on state; and a second signal reception module configured to receive a high beam indication signal indicating that the high beam is in a turn-on state, wherein the first signal transmission module is configured to transmit the turn-off alert signal on condition that the second signal reception module receives the high beam indication signal.

In an embodiment, the vehicle-mounted communication device further comprises: a controller electrically connected to the first signal transmission module, the first signal reception module, the second signal transmission module, the second signal reception module, and the processor, wherein the controller is configured to: control the second signal reception module and the first signal transmission module to be turned on and the second signal transmission module and the first signal reception module to be turned off on condition that a low beam of the vehicle is turned on, and control second signal reception module and the first signal transmission module to be turned off and the second signal transmission module and the first signal reception module to be turned on on condition that the high beam of the vehicle is turned on.

In an embodiment, the vehicle-mounted communication device further comprises: an ambient light sensor configured to detect brightness of ambient light, wherein the processor is configured to execute an operation of switching the vehicle to low beam illumination on condition that the high beam of the vehicle is turned on, the first signal reception module receives the turn-off alert signal, and the brightness of the ambient light is greater than a preset threshold.

In an embodiment, the first signal transmission module and the second signal transmission module are visible light transmission modules, and the first signal reception module and the second signal reception module are visible light reception modules, wherein the turn-off alert signal and the high beam indication signal are different in at least one of the following aspects: a light flickering frequency, a light color, a light signal duty ratio, and light intensity.

In an embodiment, the first signal transmission module comprises a first controller, a first communication light, and a first optical filter, wherein the first controller controls the first communication light to flicker at a first frequency, and the first optical filter allows light of a first color in light emitted by the first communication light to pass through, so that the turn-off alert signal is an optical signal of the first color which flickers at the first frequency; and the first signal reception module comprises a first optical receiver and a third optical filter, wherein the third optical filter allows the light of the first color to pass through, and the first optical receiver is configured to receive an optical signal passing through the third optical filter.

In an embodiment, the second signal transmission module comprises a second controller, a second communication light, and a second optical filter, wherein the second controller controls the second communication light to flicker at a second frequency, and the second optical filter allows light of a second color in light emitted by the second communication light to pass through, so that the high beam indication signal is an optical signal of the second color which flickers at the second frequency; and the second signal reception module comprises a second optical receiver and a fourth optical filter, wherein the fourth optical filter allows the light of the second color to pass through, and the second optical receiver is configured to receive an optical signal passing through the fourth optical filter.

In an embodiment, the vehicle-mounted communication device further comprises: a signal processor configured to filter out signals of frequencies other than the first frequency and the second frequency.

In an embodiment, the second frequency is a frequency which is generated randomly according to a plurality of preset fixed frequencies.

In an embodiment, the high beam indication signal has a duty ratio less than that of the turn-off alert signal.

According to another aspect of the present disclosure, there is provided a vehicle comprising the vehicle-mounted communication device described in any of the above embodiments.

According to yet another aspect of the present disclosure, there is provided a method for the vehicle-mounted communication device described in any of the above embodiments. The method comprises: receiving a turn-off alert signal for alerting to turn off a high beam transmitted by another vehicle; and when the high beam of the vehicle is turned on and the turn-off alert signal is received, performing one of the following operations: switching the vehicle to low beam illumination; and generating a prompt signal for prompting to switch to low beam illumination.

In an embodiment, the method further comprises: determining whether a particular region of the vehicle is illuminated by a high beam; and when it is determined that the particular region of the vehicle is illuminated by the high beam, transmitting a turn-off alert signal for alerting to turn off the high beam.

In an embodiment, wherein the step of determining whether a particular region of the vehicle is illuminated by a high beam comprises: when a high beam indication signal indicating that a high beam is in a turn-on state is received, determining that the particular region of the vehicle is illuminated by the high beam, wherein the method further comprises: when the high beam of the vehicle is turned on, transmitting a high beam indication signal indicating that the high beam is in a turn-on state.

In an embodiment, the method further comprises: detecting brightness of ambient light; and when the high beam of the vehicle is turned on, the turn-off alert signal is received, and the detected brightness of the ambient light is greater than a preset threshold, performing an operation of switching the vehicle to low beam illumination.

In an embodiment, the turn-off alert signal and the high beam indication signal are visible light signals, wherein the turn-off alert signal and the high beam indication signal are different in at least one of the following aspects: a light flickering frequency, a light color, a light signal duty ratio, and light intensity.

In an embodiment, the turn-off alert signal is an optical signal of a first color which flickers at a first frequency, and the high beam indication signal is an optical signal of a second color which flickers at a second frequency.

In an embodiment, the method further comprises: filtering out signals of frequencies other than the first frequency and the second frequency.

BRIEF DESCRIPTION OF THE DRAWINGS

In order to more clearly explain the technical solutions according to the embodiments of the present disclosure, the accompanying drawings used in the description of the embodiments will be briefly described below. It is obvious that the accompanying drawings in the following description are merely some embodiments of the present disclosure. Those of ordinary skill in the art can also obtain other accompanying drawings based on these accompanying drawings without any creative work.

DETAILED DESCRIPTION

The technical solutions in the embodiments of the present disclosure will be clearly and completely described below with reference to the accompanying drawings in the embodiments of the present disclosure. Obviously, the described embodiments are merely some embodiments but not all the embodiments of the present disclosure. All other embodiments obtained by those of ordinary skill in the art based on the embodiments of the present disclosure without any creative work shall fall within the protection scope of the present disclosure.

It should be pointed out that the following scenarios of the embodiments relate to a first vehicle and a second vehicle, but this is only for convenience of description. In other embodiments of the present disclosure, more vehicles may also be included, and the first vehicle may be in communication (for example, visible light communication) with one or more other vehicles at the same time.

Figure 1A:
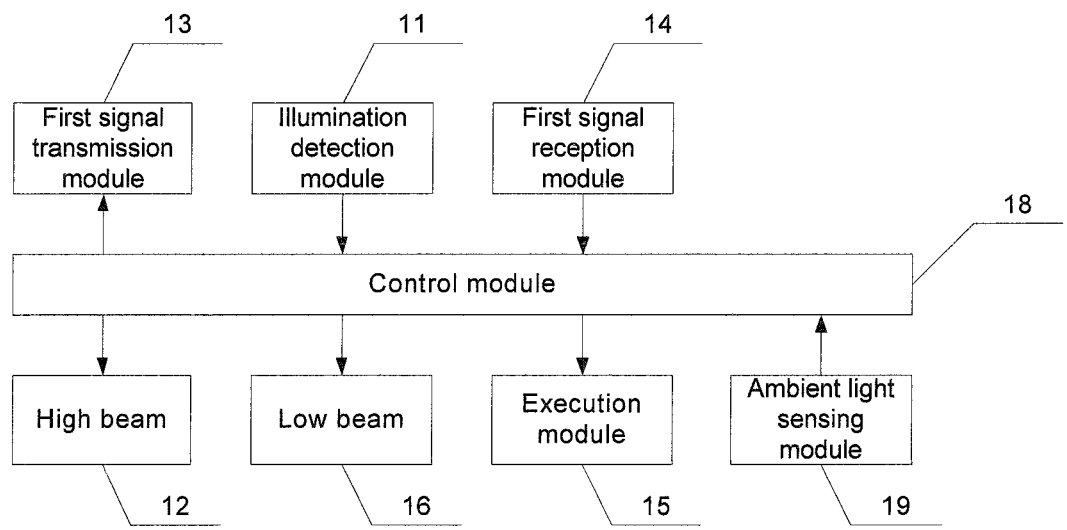
FIG. 1a is a structural block diagram of a vehicle-mounted communication device according to an embodiment of the present disclosure.

FIG. 1a illustrates a vehicle-mounted communication device according to an embodiment of the present disclosure. In the present embodiment, the vehicle-mounted communication device in FIG. 1a is provided in a first vehicle. As shown in FIG. 1a, the vehicle-mounted communication device comprises a first signal transmission module 13 configured to transmit a turn-off alert signal for alerting to turn off a high beam on condition that it is determined that a particular region of the first vehicle is illuminated by the high beam; a first signal reception module 14 configured to receive a turn-off alert signal for alerting to turn off a high beam transmitted by a second vehicle; a processor 15 configured to perform one of the following operations on condition that the high beam of the first vehicle is turned on and the first signal reception module receives the turn-off alert signal: switching the first vehicle to low beam illumination; and generating a prompt signal for prompting to switch to low beam illumination.

The first signal transmission module 13, the first signal reception module 14, and the processor 15 are included in the vehicle-mounted communication device, so that the vehicle-mounted communication device has a capability of transmitting and receiving a turn-off alert signal, and switching a headlight illumination mode according to the received turn-off alert signal. Thus, vehicles provided with such a vehicle-mounted communication device can alert each other to turn off a high beam, so as to suppress the occurrence of traffic accidents.

In one embodiment, the particular region may be, for example, positions such as a front end, a front window, a driver's seat, etc. of the vehicle.

In one embodiment, the prompt signal may be voice prompt information, or light-up or light flickering indication information which may be observed by a driver, and a specific form of the prompt signal is not limited in the embodiment of the present disclosure.

In one embodiment, the vehicle-mounted communication device may further comprise an illumination sensor 11. The illumination sensor 11 is configured to detect whether the particular region of the first vehicle is illuminated by the high beam. In practical applications, as light intensity of the high beam is different from that of a low beam, it may be judged whether the particular region of the first vehicle is illuminated by a high beam of a second vehicle by sensing intensity of light illuminated on the particular region of the first vehicle.

In this way, in the embodiment of the present disclosure, the illumination sensor, the first signal transmission module, the first signal reception module, and the processor are mounted on vehicles, so that when one of the vehicles which encounter turns on a high beam and the other one turns on a low beam, the vehicle which turns on the low beam detects that a particular region thereof is illuminated by the high beam by using an illumination sensor thereof; and then transmits a turn-off alert signal for alerting to turn off the high beam by using a first signal transmission module thereof; and the vehicle which turns on the high beam receives the turn-off alert signal by using a first signal reception module thereof, and then directly switches to low beam illumination and/or transmits a prompt signal for switching to low beam illumination by using a processor thereof, wherein the prompt signal may prompt a driver to switch the high beam to a low beam. Compared with a prompt manner of turning on a high beam and a low beam alternatively by an oncoming vehicle in the conventional art, the manner of generating a prompt signal from the vehicle itself or forcing switching of the high beam is more direct and effective to the driver. Therefore, the embodiment of the present disclosure can effectively alert the driver to turn off the high beam or force switching of the high beam when the vehicles encounter, thereby reducing the occurrence of accidents.

In one embodiment, the vehicle-mounted communication device of FIG. 1a may further comprise a controller 18 electrically connected to the illumination sensor 11, the first signal transmission module 13, the first signal reception module 14, and the processor 15.

The controller 18 is configured to control the illumination sensor 11 and the first signal transmission module 13 to be turned on and the first signal reception module 14 to be turned off on condition that a low beam 16 of the first vehicle is turned on. The controller 18 is further configured to control the illumination sensor 11 and the first signal transmission module 13 to be turned off and the first signal reception module 14 to be turned on on condition that a high beam 12 of the first vehicle is turned on.

In one embodiment, the vehicle-mounted communication device in FIG. 1a further comprises an ambient light sensor 19 configured to detect brightness of ambient light. In the embodiment, the processor 15 is configured to execute an operation of switching the first vehicle to low beam illumination on condition that the high beam 12 of the first vehicle is turned on, the first signal reception module 14 receives the turn-off alert signal, and the brightness of the ambient light is greater than a preset threshold. The ambient light sensor 19 is configured to detect the brightness of the ambient light, and may judge whether the current environment is under a street light or is not under a street light through the brightness of the ambient light. When the ambient light sensor 19 detects that the ambient light has relatively high brightness, it may be considered that the current environment is under a street light. In this case, the processor 15 may directly switch the current high beam illumination to low beam illumination.

Figure 1B:
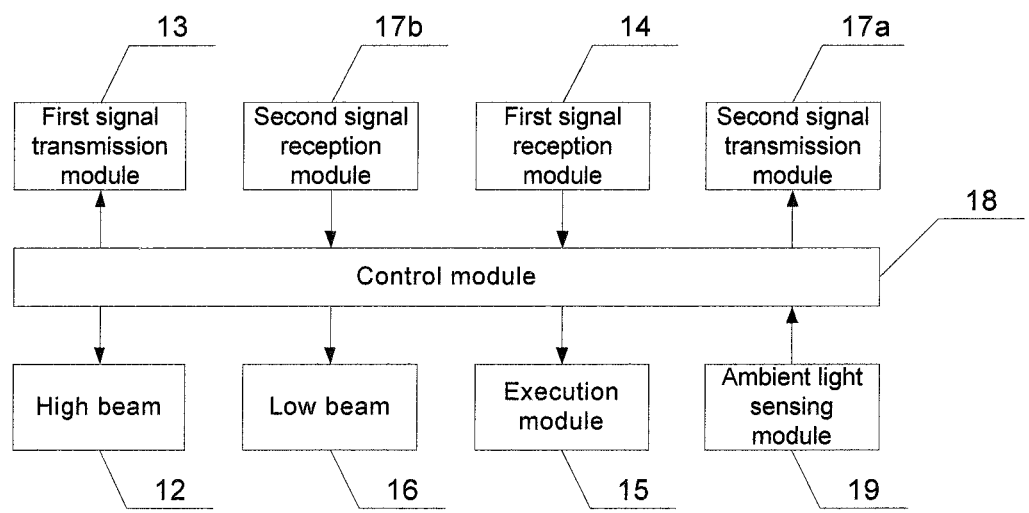
FIG. 1b is a structural block diagram of a vehicle-mounted communication device according to another embodiment of the present disclosure.

FIG. 1b illustrates a vehicle-mounted communication device according to another embodiment of the present disclosure. The vehicle-mounted communication device of FIG. 1b differs from the vehicle-mounted communication device of FIG. 1a in that the illumination sensor 11 is not provided in FIG. 1b, and instead, a second signal transmission module 17a and a second signal reception module 17b are provided in FIG. 1b. Other modules in FIG. 1b may be the same as corresponding modules in FIG. 1a and will not be described in detail here.

The second signal transmission module 17a is configured to transmit a high beam indication signal indicating that the high beam 12 is in a turn-on state. The second signal reception module 17b is configured to receive a high beam indication signal indicating that a high beam is in a turn-on state.

In one embodiment, the first signal transmission module 13 is configured to transmit a turn-off alert signal only on condition that the second signal reception module 17b receives the high beam indication signal.

In one embodiment, the vehicle-mounted communication device of FIG. 1b further comprises a controller 18 electrically connected to the first signal transmission module 13, the first signal reception module 14, the second signal transmission module 17a, the second signal reception module 17b, and the processor 15.

The controller 18 is configured to control the second signal reception module 17b and the first signal transmission module 13 to be turned on and the second signal transmission module 17a and the first signal reception module 14 to be turned off on condition that the low beam 16 of the first vehicle is turned on. The controller 18 is further configured to control the second signal reception module 17b and the first signal transmission module 13 to be turned off and the second signal transmission module 17a and the first signal reception module 14 to be turned on on condition that the high beam 12 of the first vehicle is turned on.

In the embodiment of the present disclosure, the vehicle-mounted communication device is mounted on vehicles, so that when one of the vehicles which encounter turns on a high beam and the other one turns on a low beam, the vehicle which turns on the low beam determines that a particular region thereof is illuminated by the high beam by using communication between a second signal transmission module and a second signal reception module thereof; and then transmits a turn-off alert signal for alerting to turn off the high beam by using a first signal transmission module thereof; and the vehicle which turns on the high beam receives the turn-off alert signal by using a first signal reception module thereof, and then directly switches to low beam illumination and/or transmits a prompt signal for switching to low beam illumination by using a processor thereof, wherein the prompt signal may prompt a driver to switch the high beam to a low beam. Compared with a prompt manner of turning on a high beam and a low beam alternatively by an oncoming vehicle in the conventional art, the manner of generating a prompt signal from the vehicle itself or forcing switching of the high beam is more direct and effective to the driver. Therefore, the embodiment of the present disclosure can effectively alert the driver to turn off the high beam or force switching of the high beam when the vehicles encounter, thereby reducing the occurrence of accidents.

Figure 2:
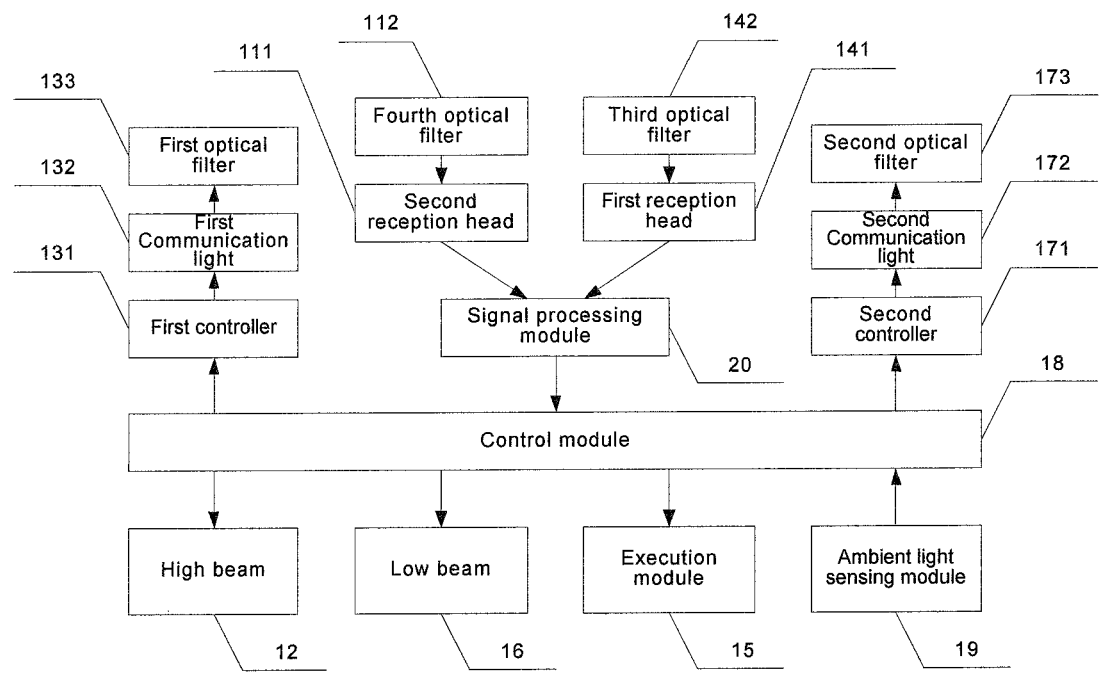
FIG. 2 is a more detailed structural block diagram of a vehicle-mounted communication device according to another embodiment of the present disclosure.

FIG. 2 illustrates a more detailed structure of the vehicle-mounted communication device of FIG. 1b.

In FIG. 2, the first signal transmission module 13 and the second signal transmission module 17a are visible light transmission modules, and the first signal reception module 14 and the second signal reception module 17b are visible light reception modules.

In one embodiment, the turn-off alert signal transmitted by the first signal transmission module 13 and the high beam indication signal transmitted by the second transmission module 17a are different in at least one of the following aspects: a light flickering frequency, a light color, a light signal duty ratio, and light intensity.

Specifically, as shown in FIG. 2, the first signal transmission module 13 specifically comprises a first controller 131, a first communication light 132, and a first optical filter 133. The first controller 131 controls the first communication light 132 to flicker at a first frequency, and the first optical filter 133 allows light of a first color in light emitted by the first communication light 132 to pass through, wherein the turn-off alert signal is an optical signal of the first color which flickers at the first frequency. The first signal reception module 14 comprises a first optical receiver 141 and a third optical filter 142. The third optical filter 142 allows the light of the first color to pass through, and the first optical receiver 141 is configured to receive an optical signal passing through the third optical filter 142.

In practical applications, as a square wave signal has a duty ratio of 50%, the turn-off alert signal may be a square wave signal. In this way, when the first communication light 132 transmits the turn-off alert signal, the first communication light 132 may assist the low beam 16 in illuminating a road surface to increase illumination brightness and facilitate the driver's driving.

The second signal transmission module 17a specifically comprises a second controller 171, a second communication light 172, and a second optical filter 173. The second controller 171 controls the second communication light 172 to flicker at a second frequency, and the second optical filter 173 allows light of a second color in light emitted by the second communication light 172 to pass through, wherein the high beam indication signal is an optical signal of the second color which flickers at the second frequency. The second signal reception module 17b comprises a second optical receiver 111 and a fourth optical filter 112. The fourth optical filter 112 allows the light of the second color to pass through; and the second optical receiver 111 is configured to receive an optical signal passing through the fourth optical filter 112.

Figure 3:
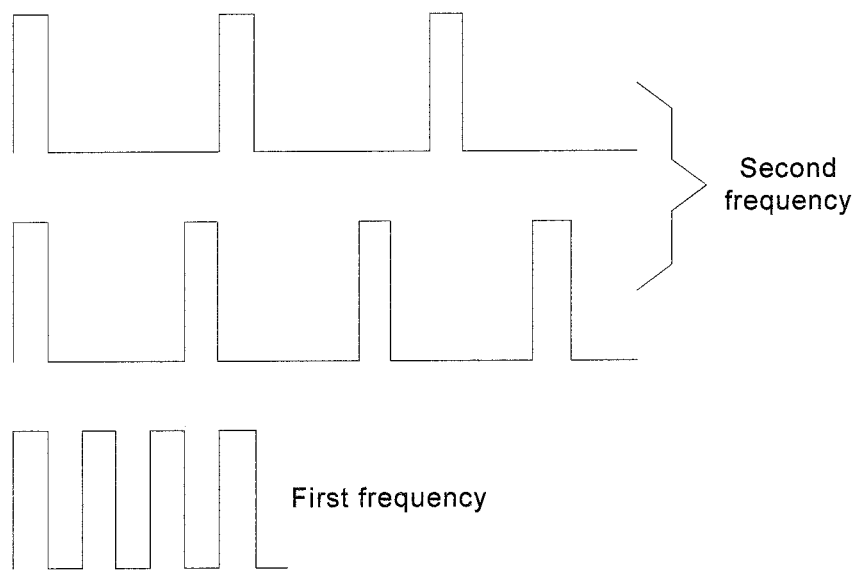
FIG. 3 is a diagram of a first frequency and a second frequency according to an embodiment of the present disclosure.

In general, the high beam indication signal has a duty ratio less than that of the turn-off alert signal. As shown in FIG. 3, duty ratios of a plurality of fixed frequencies may be set to be less than 33%. In this way, the power consumption of the second signal transmission module 17a can be reduced, and a probability that a constant signal is formed when a plurality of high beam indication signals are superposed can further be reduced. In addition, in practical applications, the second frequency may be generated randomly among the plurality of preset fixed frequencies, which can reduce the probability that a constant signal is formed when a plurality of high beam indication signals are superposed, thereby reducing the probability of misjudgment.

The second optical filter 173 and the fourth optical filter 112 may cooperate to filter out the interferences of optical signals of colors other than the second color to the high beam indication signal; and the first optical filter 133 and the third optical filter 142 may cooperate to filter out the interferences of optical signals of colors other than the first color to the turn-off alert signal.

In practical applications, on condition that the low beam 16 of the first vehicle is in a turn-on state, when the second optical receiver 111 receives a non-constant signal having a second frequency, it is considered that the high beam indication signal is received, and when the second optical receiver 111 receives a constant signal, it is considered that it is generated due to the effect of ambient light. On condition that the high beam 12 of the first vehicle is in a turn-on state, when the signal received by the first optical receiver 141 is signal of a first frequency, it is considered that the turn-off alert signal for alerting to turn off the high beam 12 is received. It should be illustrated that when the turn-off alert signal is a square wave signal, if there are interference signals such as other lights in the environment, the square wave signal and the interference signals in the environment are likely to be superposed to form a constant signal. The interference signals also generate brightness, which may also facilitate a driver to see the road surface. Therefore, when the first optical receiver 141 receives a constant signal, is may also be considered that a turn-off alert signal is received and thereby the high beam 12 is turned off.

Further, as shown in FIG. 2, the vehicle-mounted communication device further comprises a signal processor 20. The signal processor 20 is electrically connected to the first signal reception module 14, the second signal reception module 17b, and the controller 18; and the signal processor 20 is configured to filter out signals of frequencies other than the first frequency and the second frequency. The signal processor 20 is provided, so that the interferences of signals of frequencies other than the first frequency and the second frequency to reception and judgment of the high beam indication signal and the turn-off alert signal can be reduced. In practical applications, the signal processor 20 may be a filter.

Figure 8:
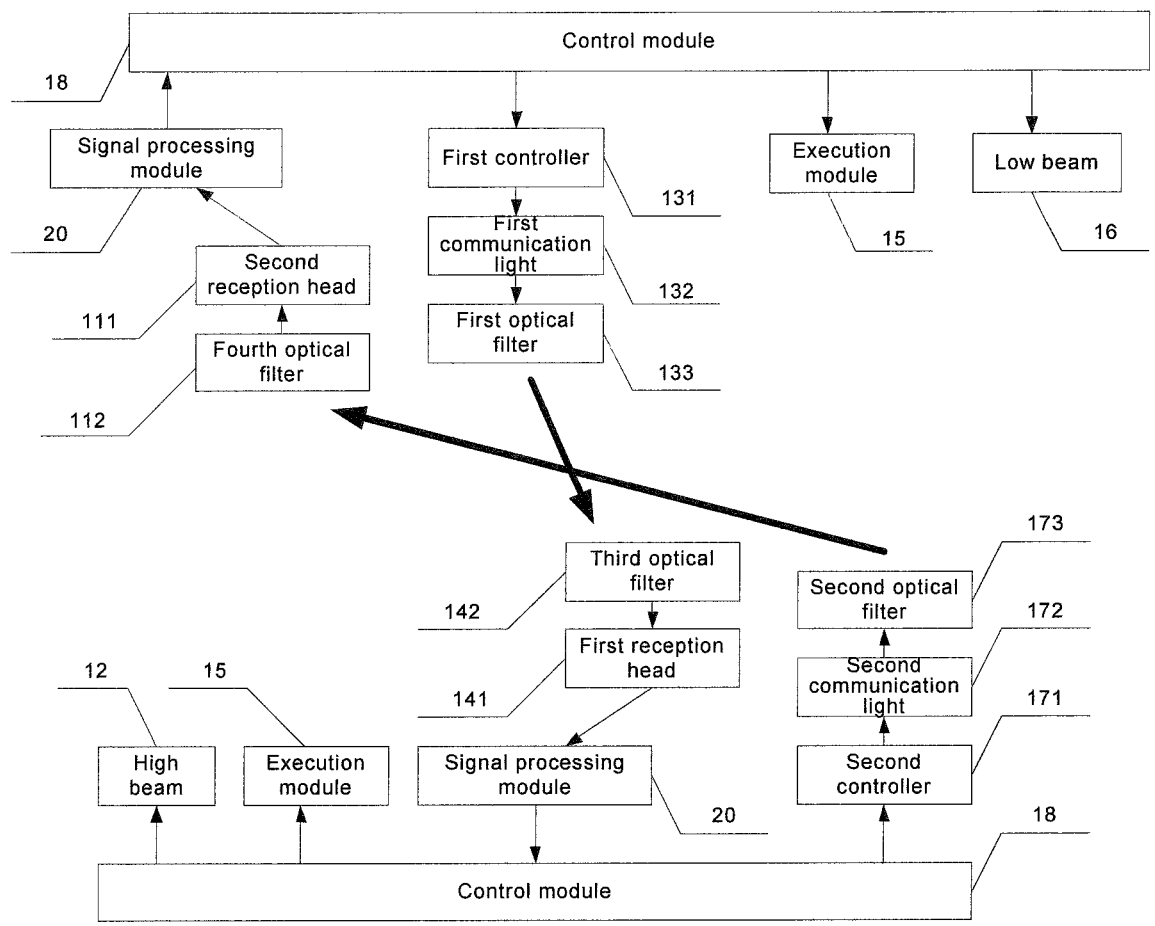
FIG. 8 is a diagram of information interaction between two vehicles when the two vehicles encounter according to an embodiment of the present disclosure.

FIG. 8 is a diagram of information interaction between two vehicles when the two vehicles encounter. As shown in FIG. 8, when a lower vehicle in FIG. 8 turns on a high beam, and an upper vehicle in FIG. 8 turns on a low beam, a second communication light 172 in the lower vehicle transmits a high beam indication signal, and a second optical receiver 111 in the upper vehicle receives the high beam indication signal. After the second optical receiver 111 in the upper vehicle receives the high beam indication signal, a first communication light 132 in the upper vehicle transmits a turn-off alert signal, and a first optical receiver 141 in the lower vehicle receives the turn-off alert signal. After the first optical receiver 141 in the lower vehicle receives the turn-off alert signal, a processor 15 in the lower vehicle may directly switch the vehicle to low beam illumination and/or transmit a prompt signal of switching to low beam illumination. A driver of the lower vehicle may switch the high beam to a low beam according to the prompt of the prompt signal.

Another embodiment of the present disclosure provides a vehicle comprising the vehicle-mounted communication device described in any of the above embodiments.

Figure 4:
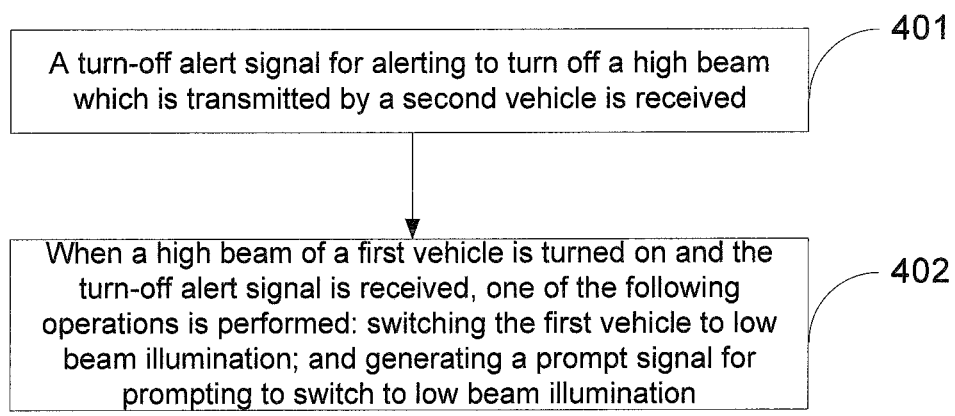
FIG. 4 is a flowchart of a method for a vehicle-mounted communication device according to an embodiment of the present disclosure.

A further embodiment of the present disclosure provides a method for the vehicle-mounted communication device described in any of the above embodiments. As shown in FIG. 4, the method comprises the following steps.

In step 401, a turn-off alert signal for alerting to turn off a high beam which is transmitted by a second vehicle is received.

In step 402, when a high beam of a first vehicle is turned on and the turn-off alert signal is received, one of the following operations is performed: switching the first vehicle to low beam illumination; and generating a prompt signal for prompting to switch to low beam illumination.

Steps 401 and 402 set forth a function of a vehicle-mounted communication device receiving a turn-off alert signal transmitted by a vehicle-mounted communication device of another vehicle and performing an operation of switching an illumination mode based thereon.

Figure 5:
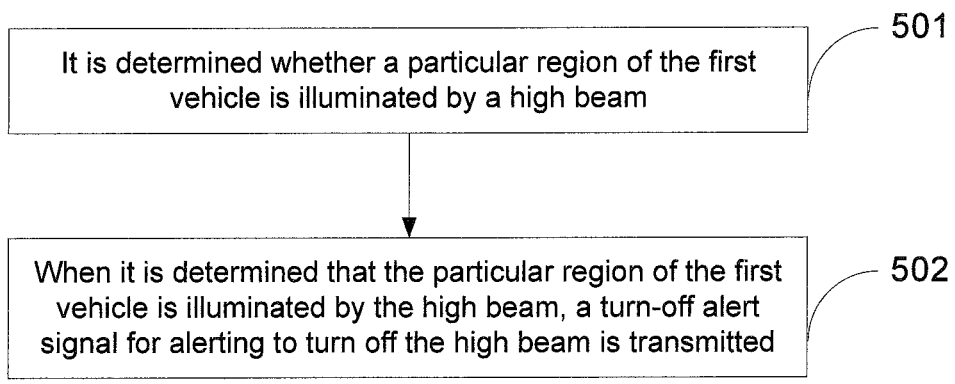
FIG. 5 is a flowchart of a method for a vehicle-mounted communication device according to another embodiment of the present disclosure.

Yet another embodiment of the present disclosure provides a method for the vehicle-mounted communication device described in any of the above embodiments. As shown in FIG. 5, the method comprises the following steps.

In step 501, it is determined whether a particular region of a first vehicle is illuminated by a high beam.

In step 502, when it is determined that the particular region of the first vehicle is illuminated by the high beam, a turn-off alert signal for alerting to turn off the high beam is transmitted.

In one embodiment, the step of determining whether a particular region of a first vehicle is illuminated by a high beam is implemented by detecting an illumination condition of the particular region.

In another embodiment, the step of determining whether a particular region of a first vehicle is illuminated by a high beam is implemented by transmitting and receiving a high beam indication signal indicating that a high beam is in a turn-on state. In this case, the method further comprises: when the high beam of the first vehicle is turned on, transmitting a high beam indication signal indicating that the high beam is in a turn-on state.

Steps 501 and 502 set forth a function of a vehicle-mounted communication device transmitting a turn-off alert signal to a vehicle-mounted communication device of another vehicle based on whether the vehicle-mounted communication device itself is illuminated by a high beam.

When the vehicle-mounted communication device of each vehicle has two functions shown in FIG. 4 and FIG. 5, a high-beam-on alert may be transmitted to each other, which reduces the occurrence of accidents.

In an embodiment implementing the methods shown in FIGS. 4 and 5, when one of vehicles which encounter turns on a high beam and the other one turns on a low beam, the vehicle which turns on the low beam firstly detects to determine whether a particular region thereof is illuminated by the high beam, and when it is determined that the particular region thereof is illuminated by the high beam, transmits a turn-off alert signal for alerting to turn off the high beam; and the vehicle which turns on the high beam receives the turn-off alert signal, and directly switches to low beam illumination and/or transmits a prompt signal for switching to low beam illumination after receiving the turn-off alert signal, wherein the prompt signal may prompt a driver to switch the high beam to a low beam. Compared with a prompt manner of turning on a high beam and a low beam alternatively by an oncoming vehicle in the conventional art, the manner of generating a prompt signal from the vehicle itself or forcing switching of the high beam is more direct and effective to the driver. Therefore, the embodiment of the present disclosure can effectively alert the driver to turn off the high beam or force switching of the high beam when the vehicles encounter, thereby reducing the occurrence of accidents.

The methods shown in FIGS. 4 and 5 correspond to contents of the structures shown in FIGS. 1a and 1b and FIG. 2. The illustration and description made above with respect to FIGS. 1a and 1b and FIG. 2 are also applicable to corresponding steps in the methods illustrated in FIGS. 4 and 5 and will not be described in detail here.

Figure 6:
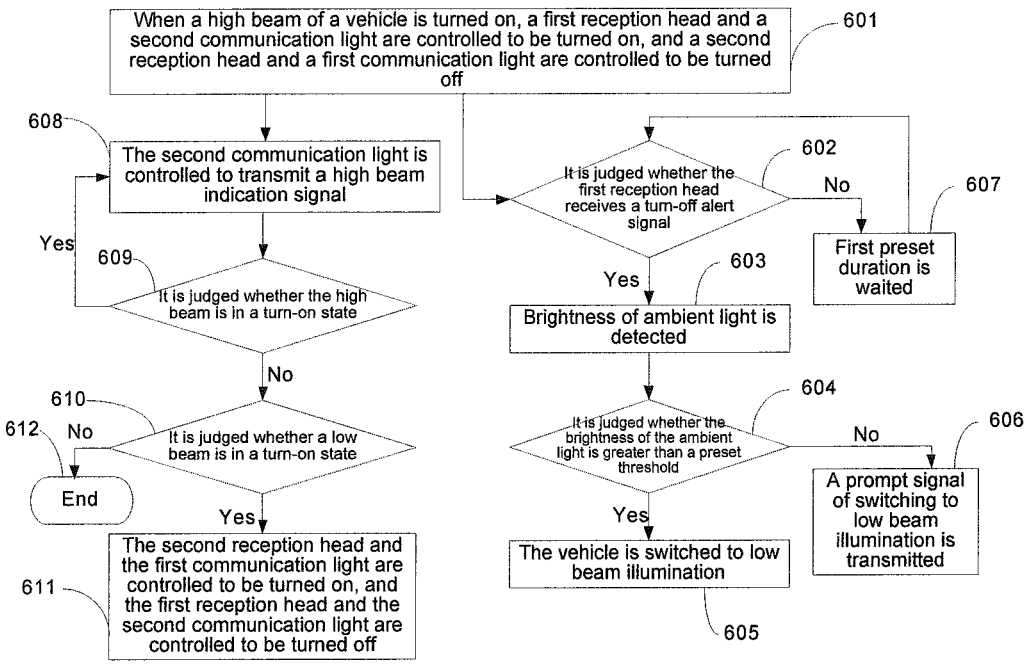
FIG. 6 is a flowchart of a method for a vehicle-mounted communication device when a high beam of the vehicle is turned on according to an embodiment of the present disclosure.
Figure 7:
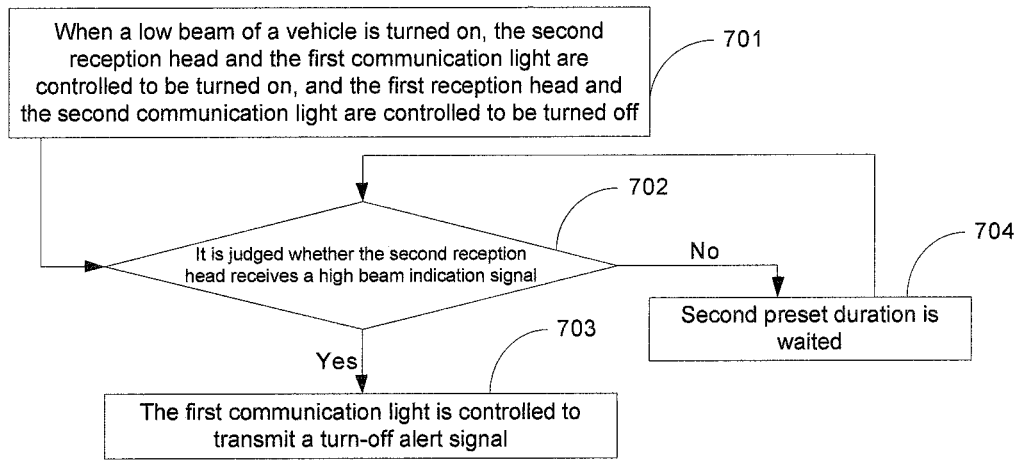
FIG. 7 is a flowchart of a method for a vehicle-mounted communication device when a low beam of the vehicle is turned on according to an embodiment of the present disclosure.

FIGS. 6 and 7 illustrate flowcharts of specific operation methods in a case that a high beam is turned on and in a case that a low beam is turned on respectively.

FIG. 6 is a specific operation method in a case that a high beam is turned on, which comprises the following steps.

In step 601, when a high beam of a vehicle is turned on, a first optical receiver and a second communication light are controlled to be turned on and a second optical receiver and a first communication light are controlled to be turned off.

The second communication light is configured to transmit a high beam indication signal, and the first optical receiver is configured to receive a turn-off alert signal.

In step 602, it is judged whether the first optical receiver receives a turn-off alert signal; if so, step 603 is performed; and if not, step 607 is performed.

In step 603, brightness of ambient light is detected.

In step 604, it is judged whether the brightness of the ambient light is greater than a preset threshold; if so, step 605 is performed; and if not, step 606 is performed.

The preset threshold is a preset value, which is not limited in the embodiments of the present disclosure, and may be set by those skilled in the art according to practical conditions.

It may be judged whether the current environment is under a street light or is not under a street light through the brightness of the ambient light. When the ambient light has relatively high brightness, it may be considered that the current environment is under a street light.

In step 605, the vehicle is switched to low beam illumination.

In step 606, a prompt signal of switching to low beam illumination is transmitted.

In step 607, step 602 is performed after waiting for first preset duration.

The first preset duration is a preset time length, which is not limited in the embodiment of the present disclosure, and may be set by those skilled in the art according to practical conditions.

It should be illustrated that, as shown in FIG. 6, after step 601 is performed, the method further comprises the following steps.

In step 608, the second communication light is controlled to transmit a high beam indication signal.

In step 609, it is judged whether the high beam is in a turn-on state; if so, step 608 is performed; and if not, step 610 is performed.

In step 610, it is judged whether the low beam is in a turn-on state; if so, step 611 is performed; and if not, step 612 is performed.

In step 611, the second optical receiver and the first communication light are controlled to be turned on and the first optical receiver and the second communication light are controlled to be turned off.

The second optical receiver is configured to receive a high beam indication signal, and the first communication light is configured to transmit a turn-off alert signal.

In step 612, the procedure ends. "End" here means that the high beam and the low beam are turned off and the procedure exits the method.

FIG. 7 is a specific operation method when a low beam is turned on, which comprises the following steps.

In step 701, when a low beam of a vehicle is turned on, a second optical receiver and a first communication light are controlled to be turned on, and a first optical receiver and a second communication light are controlled to be turned off.

The second optical receiver is configured to receive a high beam indication signal, and the first communication light is configured to transmit a turn-off alert signal.

In step 702, it is judged whether the second optical receiver receives the high beam indication signal; if so, step 703 is performed; and if not, step 704 is performed.

In step 703, the first communication light is controlled to transmit a turn-off alert signal.

In step 704, step 702 is performed after waiting for second preset duration.

The second preset duration is a preset time length, which is not limited in the embodiment of the present disclosure, and may be set by those skilled in the art according to practical conditions.

The foregoing descriptions are merely specific implementations of the present disclosure, but the protection scope of the present disclosure is not limited thereto, and changes or substitutions which are easily reached by any skilled in the art should be covered within the protection scope of the present disclosure. Therefore, the protection scope of the present disclosure should be based on the protection scope of the claims.

We claim:

1. A vehicle-mounted communication device provided in a vehicle, comprising:
    an illumination detection module to detect whether a particular region of the vehicle is illuminated by a high beam;
    a first signal transmission module to transmit a turn-off alert signal for alerting to turn off the high beam on condition that the illumination detection module detects that the particular region is illuminated by the high beam;
    a first signal reception module to receive a turn-off alert signal for alerting to turn off a high beam illumination transmitted by another vehicle;
    an execution module to perform one of the following operations on condition that the high beam illumination of the vehicle is turned on and the first signal reception module receives the turn-off alert signal transmitted by the another vehicle:
        switching the vehicle from the high beam illumination to a low beam illumination; and
        generating a prompt signal for prompting a driver of the vehicle to switch to the low beam illumination from the high beam illumination,
    a control module electrically connected to the illumination detection module, the first signal transmission module, the first signal reception module, and the execution module,
    wherein the control module:
        controls the illumination detection sensor and the first signal transmission module to be turned on and the first signal reception module to be turned off on condition that the low beam illumination of the vehicle is turned on, and
        controls the illumination detection module and the first signal transmission module to be turned off and the first signal reception module to be turned on on condition that the high beam illumination of the vehicle is turned on.

2. The vehicle-mounted communication device according to claim 1, further comprising:
    an ambient light sensing module to detect brightness of ambient light,
    wherein the execution module executes an operation of switching the vehicle to the low beam illumination on condition that the high beam illumination of the vehicle is turned on, the first signal reception module receives the turn-off alert signal transmitted by the another vehicle, and the brightness of the ambient light is greater than a preset threshold.

3. The vehicle-mounted communication device according to claim 1, wherein the first signal transmission module is a visible light transmission module and the first signal reception module is a visible light reception module.

4. The vehicle-mounted communication device according to claim 3, wherein the first signal transmission module comprises a first controller, a first communication light, and a first optical filter, wherein the first controller controls the first communication light to flicker at a first frequency, and the first optical filter allows light of a first color in light emitted by the first communication light to pass through, so that the turn-off alert signal transmitted by the first signal transmission module is an optical signal of the first color which flickers at the first frequency; and
    the first signal reception module comprises a first reception head and a third optical filter, wherein the third optical filter allows the light of the first color to pass through, and the first reception head receives an optical signal passing through the third optical filter.

5. The vehicle-mounted communication device according to claim 4, wherein the first signal reception module further comprises
    a signal processing module to filter out signals of frequencies other than the first frequency.

6. A vehicle comprising the vehicle-mounted communication device according to claim 1.

7. A method for the vehicle-mounted communication device according to claim 1, comprising:
    determining, by the illumination detection module, whether the particular region of the vehicle is illuminated by the high beam; and when the particular region of the vehicle is illuminated by the high beam, transmitting, by the first signal transmission module, the turn-off alert signal for alerting to turn off the high beam;
    receiving, by the first signal reception module, the turn-off alert signal for alerting to turn off the high beam illumination transmitted by the another vehicle; and when the high beam illumination of the vehicle is turned on and said turn-off alert signal is received, performing, by the execution module, one of the following operations:
switching the vehicle to the low beam illumination from the high beam illumination; and
generating the prompt signal for prompting the driver of the vehicle to switch to the low beam illumination from the high beam illumination;
controlling, by the control module, the illumination detection module and the first signal transmission module to be turned on and the first signal reception module to be turned off on condition that the low beam illumination of the vehicle is turned on, and
controlling, by the control module, the illumination detection module and the first signal transmission module to be turned off and the first signal reception module to be turned on on condition that the high beam illumination of the vehicle is turned on.

8. The method according to claim 7, further comprising:
detecting, by an ambient light sensing module connected to the control module, brightness of ambient light; and
when the high beam illumination of the vehicle is turned on, the turn-off alert signal, transmitted by the another vehicle, is received, and the detected brightness of the ambient light is greater than a preset threshold, performing, by the execution module, an operation of switching the vehicle from the high beam illumination to the low beam illumination.

9. The method according to claim 7, wherein the turn-off alert signal is visible light signal.

10. The method according to claim 9, wherein the first signal transmission module comprises a first controller, a first communication light, and a first optical filter, wherein the first controller controls the first communication light to flicker at a first frequency, and the first optical filter allows light of a first color in light emitted by the first communication light to pass through, so that the turn-off alert signal is an optical signal of a first color which flickers at a first frequency.

11. The method according to claim 10, further comprising:
filtering out, by a signal processing module of the first signal reception module, signals of frequencies other than the first frequency.

12. A vehicle-mounted communication device provided in a vehicle, comprising:
a first signal transmission module to transmit a turn-off alert signal for alerting to turn off a high beam illumination of another vehicle on condition that a second signal reception module receives a high beam indication signal transmitted by the another vehicle; (the vehicle is in low beam)
a first signal reception module to receive a turn-off alert signal for alerting to turn off the high beam illumination of the vehicle transmitted by another vehicle; (the vehicle is in high beam)
a second signal transmission module to transmit the high beam indication signal indicating that the high beam illumination of the vehicle is in a turn-on state; (the vehicle is in high beam)
the second signal reception module to receive the high beam indication signal indicating that the high beam illumination of the another vehicle is in a turn-on state and transmitted by the another vehicle; (the vehicle is in low beam)
an execution module to perform one of the following operations on condition that the high beam illumination of the vehicle is turned on and the first signal reception module receives the turn-off alert signal transmitted by the another vehicle:
switching the vehicle from the high beam illumination to a low beam illumination; and
generating a prompt signal for prompting a driver of the vehicle to switch to the low beam illumination from the high beam illumination,
a control module electrically connected to the first signal transmission module, the first signal reception module, the second signal transmission module, the second signal reception module, and the execution module,
wherein the control module:
controls the second signal reception module and the first signal transmission module to be turned on and the second signal transmission module and the first signal reception module to be turned off on condition that the low beam illumination of the vehicle is turned on, and
controls the second signal reception module and the first signal transmission module to be turned off and the second signal transmission module and the first signal reception module to be turned on on condition that the high beam illumination of the vehicle is turned on.

13. The vehicle-mounted communication device according to claim 12, further comprising:
an ambient light sensing module to detect brightness of ambient light, wherein the execution module executes an operation of switching the vehicle to the low beam illumination on condition that the high beam illumination of the vehicle is turned on, the first signal reception module receives the turn-off alert signal transmitted by the another vehicle, and the brightness of the ambient light is greater than a preset threshold.

14. The vehicle-mounted communication device according to claim 12, wherein the first signal transmission module and the second signal transmission module are visible light transmission modules, and the first signal reception module and the second signal reception module are visible light reception modules,
wherein each turn-off alert signal and each high beam indication signal are different in at least one of the following aspects: a light flickering frequency, a light color, a light signal duty ratio, and light intensity.

15. The vehicle-mounted communication device according to claim 14, wherein the first signal transmission module comprises a first controller, a first communication light, and a first optical filter, wherein the first controller controls the first communication light to flicker at a first frequency, and the first optical filter allows light of a first color in light emitted by the first communication light to pass through, so that the turn-off alert signal transmitted by the first signal transmission module is an optical signal of the first color which flickers at the first frequency; and
the first signal reception module comprises a first reception head and a third optical filter, wherein the third optical filter allows the light of the first color to pass through, and the first reception head receives an optical signal passing through the third optical filter.

16. The vehicle-mounted communication device according to claim 15, wherein the second signal transmission module comprises a second controller, a second communication light, and a second optical filter, wherein the second controller controls the second communication light to flicker at a second frequency, and the second optical filter allows light of a second color in light emitted by the second communication light to pass through, so that the high beam indication signal transmitted by the second signal transmission module is an optical signal of the second color which flickers at the second frequency; and the second signal reception module comprises a second reception head and a fourth optical filter, wherein the fourth optical filter allows the light of the second color to pass through, and the second reception head receives an optical signal passing through the fourth optical filter.

17. The vehicle-mounted communication device according to claim 16, further comprising:

a signal processing module to filter out signals of frequencies other than the first frequency and the second frequency.

18. The vehicle-mounted communication device according to claim 16, wherein the second frequency is a frequency which is generated randomly according to a plurality of preset fixed frequencies.

19. The vehicle-mounted communication device according to claim 16, wherein each high beam indication signal has a duty ratio less than that of each turn-off alert signal.

* * * * *